United States Patent
Wagner et al.

(10) Patent No.: US 6,769,482 B2
(45) Date of Patent: Aug. 3, 2004

(54) SYSTEM AND METHOD FOR SWITCHING-OVER BETWEEN HEATING AND COOLING MODES

(75) Inventors: Phillip Ryan Wagner, Baltimore, OH (US); John Gilman Chapman, Jr., Delaware, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 78 days.

(21) Appl. No.: 09/983,651

(22) Filed: Oct. 25, 2001

(65) Prior Publication Data

US 2002/0166659 A1 Nov. 14, 2002

Related U.S. Application Data (60) Provisional application No. 60/289,788, filed on May 10, 2001.

(51) Int. Cl.[7] .................................................. F25B 29/00
(52) U.S. Cl. ........................ 165/254; 165/257; 165/262; 165/238; 236/46 R
(58) Field of Search .................................. 165/254, 257, 165/261, 262, 253, 238; 236/46 R (56) References Cited

U.S. PATENT DOCUMENTS

| | | | |
|---|---|---|---|
| 4,841,738 A | | 6/1989 | Katsuki et al. |
| 4,869,073 A | | 9/1989 | Kawai et al. |
| 5,819,845 A | * | 10/1998 | Ryu et al. ................... 165/254 |

* cited by examiner

Primary Examiner—Ljiljana Ciric
(74) Attorney, Agent, or Firm—Leydig, Voit & Mayer, Ltd.

(57) ABSTRACT

A heating, ventilation and air conditioning (HVAC) device (104) which includes both heating and cooling operating modes provides an easy-to-use interface (110) for selecting the operating parameters of the device (104). The interface (110) allows the input of a setpoint temperature at which the HVAC device (104) conditions the ambient temperature of a space (102). A mode switch-over algorithm (200) uses the setpoint temperature, the sensed temperature from the conditioned space, and prestored threshold values that depend on the device's operating capacities, to determine when to change the device between heating and cooling modes. Also, within each of the respective modes, a heating (300) or cooling (400) algorithm controls the engaging and disengaging of the heating and cooling elements of the device (104) to maintain the temperature of the conditioned space (102) within a desired comfort zone.

25 Claims, 4 Drawing Sheets

FIG. 4

# SYSTEM AND METHOD FOR SWITCHING-OVER BETWEEN HEATING AND COOLING MODES

RELATED APPLICATIONS

This application relates to and claims priority from U.S. Application Ser. No. 60/289,788 filed May 10, 2001 entitled PTAC HEAT/COOL SWITCHOVER ALGORITHM, the disclosure of which is hereby incorporated in its entirety by reference.

TECHNICAL FIELD

The present invention pertains to equipment for providing temperature conditioning of a space and, more particularly to such equipment that includes both heating and cooling modes of operation.

BACKGROUND ART

The heating, ventilation and air conditioning (HVAC) equipment used to regulate, or condition, the temperature of a room or other space typically includes a separate heating source such as a furnace and a cooling source such as an air conditioner. Separate controls for each type of equipment are usually provided to control turning the respective equipment on or off and setting each equipment's operating parameters. A consolidated control interface may be provided (e.g., a wall thermostat unit) but usually requires manual switching between the two types of equipment as well as separately setting the operating parameters for each equipment type.

Other HVAC equipment is used in some environments which include both a heating mode and a cooling mode in a single piece of equipment. In such a piece of equipment, either the heating elements or the cooling elements are selected for operation depending on whether the conditioned space is hotter or colder than desired. The control interface for this type of HVAC equipment is just as confusing and cumbersome as that for the separate HVAC equipment described above. In particular, a room occupant typically is required to manually switch the operating modes between heating and cooling as desired. Furthermore, for each of the different operating modes, the occupant must also set thermostat controls to set the operating parameters of the equipment.

Such an interface to control HVAC equipment is very cumbersome, especially during periods of moderate indoor or outdoor temperature variation in which the HVAC equipment would need to be switched between modes and adjusted often to consistently regulate the conditioned space. For example, such periods of temperature variations could include: seasonal transitional periods where cooling is desired in the day and heating in the evenings; the passing of a cold front during relatively warm periods; and where operation of devices (e.g., ovens, stoves, etc.) drive the room temperature out of a comfortable zone.

There is an unmet need, therefore, for a simple control interface to implement heat/cool mode switching and temperature regulation in HVAC equipment that can regulate room temperature by selecting one of a heating mode or cooling mode of operation.

DISCLOSURE OF INVENTION

The present invention meets these, and other, needs by combining hardware and software to provide HVAC equipment with a mode switching algorithm, a heating algorithm, and a cooling algorithm that requires a room occupant to merely enter a setpoint temperature to control equipment that conditions a physical space. In particular, one aspect of the present invention relates to a method for controlling equipment having a heating mode of operation and a cooling mode of operation to condition a physical space. According to this aspect, a setpoint temperature is obtained for the space, the temperature for the space is sensed and the length of time since the mode of the equipment last changed is maintained. The equipment is switched to a cooling mode if the sensed temperature remains above a first threshold temperature for at least a first period of time and the mode of the equipment has not changed within a second period of time. Alternatively, the equipment is switched to a heating mode if the sensed temperature remains below a second threshold temperature for at least a first period of time and the equipment has not changed modes of operation within a second period of time.

Another aspect of the present invention relates to a device for controlling equipment having a heating mode of operation and a cooling mode of operation to condition a physical space. According to this aspect of the invention, the device includes a microcontroller, inputs for receiving a setpoint temperature and the sensed temperature of the space, and a timer that is indicative of the length of time since the equipment last changed operating modes. The device also includes a comparator that compares the sensed temperature with a first threshold value if the equipment is the heating mode or compares the sensed temperature with a second threshold value if the equipment is in the cooling mode. Device outputs provide respective signals to the equipment to switch modes of operation depending on certain criteria. If the sensed temperature has remained above the first threshold value for at least a first time period and the timer indicates that an appropriate length of time has transpired since the last mode switch-over, then the equipment is signaled to switch from the heating mode to the cooling mode. If the sensed temperature has remained below the second threshold value for at least the first time period and the timer indicates that an appropriate length of time has transpired since the last mode switch-over, then the equipment is signaled to switch from the cooling mode to the heating mode.

A still further aspect of the present invention relates to a method for maintaining a room's temperature about a setpoint utilizing equipment having a cooling mode and a heating mode of operation. According to this aspect of the invention, the room temperature is sensed and a value is maintained indicative of when the equipment last changed operating modes. If the equipment is in the heating mode, then the equipment is switched to the cooling mode if (a) the room temperature remains above a first value for a sufficient length of time and (b) there has been an appropriately long period of time since the equipment last changed operating modes. If the equipment is in the cooling mode, then the equipment is switched to the heating mode if (a) the room temperature remains below a second value for a sufficient length of time and (b) there has been an appropriately long period of time since the equipment last changed operating modes.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawings and in which like reference numerals refer to similar elements and in which.

BEST MODE FOR CARRYING OUT THE INVENTION AND INDUSTRIAL APPLICABILITY

To aid with the understanding of the present invention, exemplary embodiments are presented within the context of a specific environment involving microcontroller-based HVAC equipment for a single conditioned room. In general, however, the invention is applicable to equipment, microprocessors and microcontrollers of other environments, such as multi-room spaces. In other instances, well-known structures, devices, and processes are shown in block diagram form, herein, in order to avoid unnecessarily obscuring the present invention.

Figure 1:
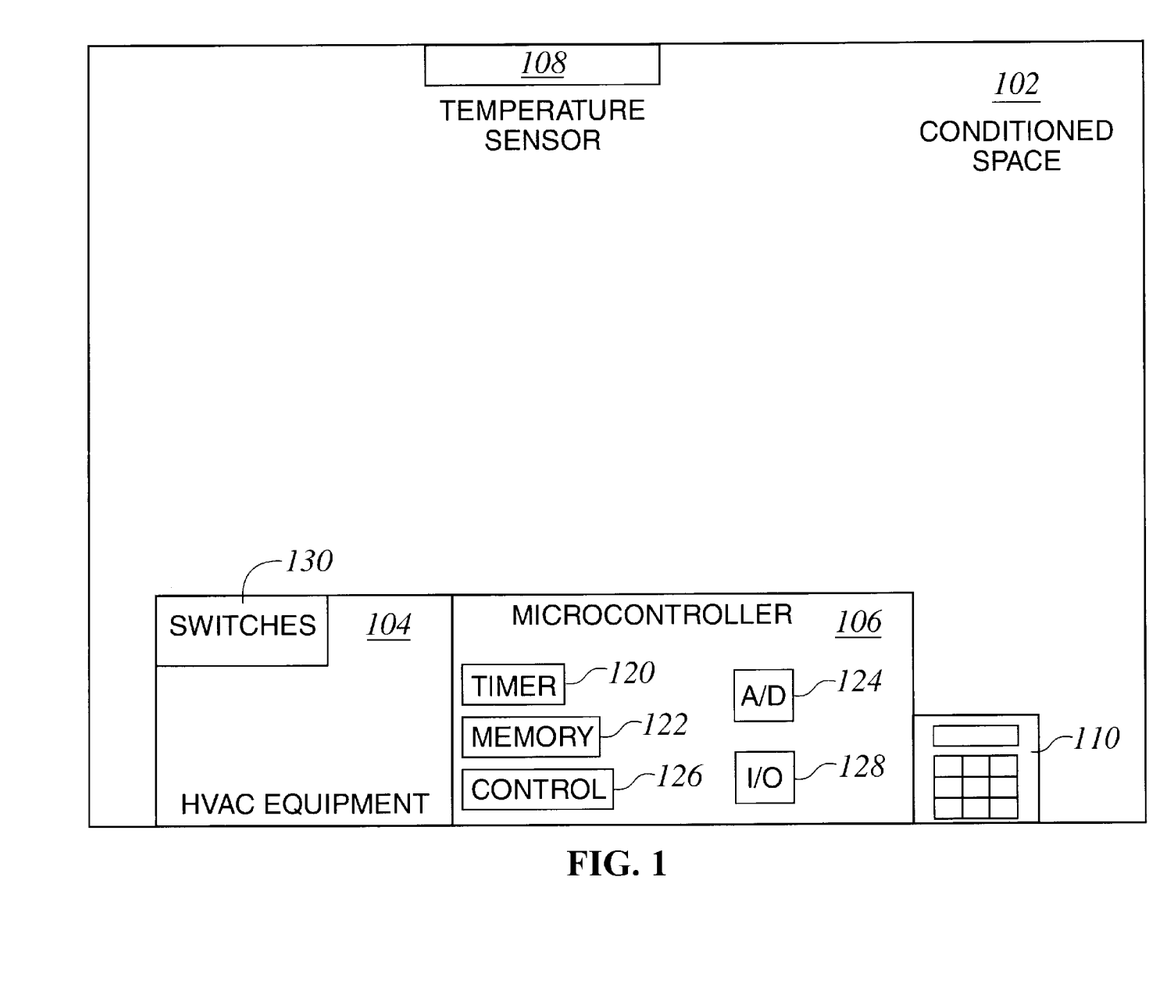
FIG. 1 illustrates an exemplary environment in which an embodiment of the present invention is beneficial.

FIG. 1 illustrates an exemplary environment for one embodiment of the present invention. In FIG. 1, a conditioned space 102, such as a room in a building is depicted. Partly within the room 102 is HVAC equipment 104 that has both heating and cooling elements (e.g., a warm air source and a cool air source) in order to provide both heating and cooling modes of operation. One example of such equipment is a package terminal air conditioner and heat pump (PTAC/PTHP) unit such as is common in many motel rooms. The present invention contemplates within its scope other, similar HVAC equipment that includes both heating and cooling modes.

The equipment 104 includes a microcontroller, or microprocessor, 106 to control its operation. The microcontroller 106 typically includes either embedded or on-board memory 122, timer and/or clock circuitry 120, a controller circuit 126, and analog-to-digital converters 124 with input/output circuitry 128. The memory 122 has stored therein a system application that is executed by the controller circuit 126, usually operating in synchronization with the clock or timer 120 in order to control operation of the equipment 104. The controller circuit 126 typically interfaces through the A/D converters 124 to at least some of the I/O circuitry 128. The I/O circuitry 128 includes inputs for receiving input data values such as keypad 110 data entry and data from a temperature sensor 108. The I/O circuitry 128 also includes outputs for transmitting signals and data to external devices such as switches 130 which control the separate heating and cooling elements of the equipment 104.

Although the conditioned room 102 is depicted as a single room, other embodiments include a multi-room environment. In such an alternative embodiment, additional blowers and vents may be necessary to effect the heating and cooling of the entire conditioned space.

According to one embodiment of the present invention, a keypad 110 is used to enter a desired temperature for the conditioned space 102. Stored within the microcontroller's memory 122 are thresholds, that are relative to the desired temperature, which determine the operating mode of the equipment 104 (i.e., cooling mode or heating mode). The microcontroller 106 runs a mode selection application as part of its overall operation which uses the sensed temperature from the sensor 108, the desired temperature entered through the keypad 110, and the stored threshold temperatures to control the operation of the equipment and, thereby, control the conditioning of the space 102 so that the temperature within the space 102 is maintained within a tolerance band. In so doing, the microcontroller does not require manual switching by a room occupant between a heating mode and a cooling mode and neither does it require the setting of separate temperatures for the different modes.

In a preferred embodiment, the threshold temperatures are set, or updated, by a technician during installation, maintenance, or fabrication of the equipment 104 and microcontroller 106 based on the size of the space 102 and the operating capacity of the heating and cooling elements of the equipment 104. In alternative embodiments, these threshold temperatures (along with the desired temperature) can be entered by a room occupant using the keypad 110. In additional embodiments, the microcontroller can include adaptive programming features, as are known to a skilled artisan, which tracks historical performance of the equipment 104 and learns the optimal operating ranges for a particular conditioned space 102.

The various software applications that execute on the microcontroller 106 include a number of variables that are used to direct the operation of the microcontroller 106. These variables includes the following:

Setpoint Temperature (SP): the desired, or target, temperature to which the space 102 is conditioned.

Ambient Temperature (AT): the temperature of the space 102 as sensed by the temperature sensor 108.

Temperature Difference (DIFF): the difference of (SP-AT).

$C_{switch}$: the temperature difference at which the equipment changes from heating mode to cooling mode.

$H_{switch}$: the temperature difference at which the equipment changes from cooling mode to heating mode.

$C_{engage}$: the temperature difference at which the cooling elements of the equipment 104 are operated to initiate cooling of the space 102.

$H_{engage}$: the temperature difference at which the heating elements of the equipment 104 are operated to initiate heating of the space 102.

$C_{disengage}$: the temperature difference at which the cooling elements of the equipment 104 are turned-off to terminate the cooling of the space 102.

$H_{disengage}$: the temperature difference at which the heating elements of the equipment 104 are turned-off to terminate the heating of the space 102.

The three pairs of analogous threshold temperatures described above are calculated relative to the setpoint such that a positive difference corresponds to an ambient temperature below the setpoint and a negative difference corresponds to an ambient temperature above the setpoint. One of ordinary skill would recognize that this convention can be reversed, or possibly scaled, as long as subsequent comparisons using these values are also similarly reversed or scaled. The unit of measure for all the differences are the same as that of the setpoint temperature.

Preferably, these threshold values are selected and programmed into the microcontroller 106 by a technician based on the heating and cooling capacities of the equipment 104, the size of the space 102, and the resolution of the temperature sensor 108. The selection of appropriate values for a particular environment is within the ability of a reasonably skilled heating and cooling engineer.

The details of selecting such values are not crucial to an understanding of the present invention and, therefore, are not included herein. However, the following relationships are maintained when selecting the different threshold values: $H_{switch} > C_{switch}$, the magnitude of $H_{switch}$ is approximately twice that of $H_{disengage}$; the magnitude of $C_{switch}$ is approximately twice that of $C_{disengage}$, Following these relationships essentially eliminates the possibility of falsely switching between heating and cooling modes. Additionally, $C_{engage} > C_{disengage}$ and $H_{disengage} < H_{engage}$, which is a direct result from the manner in which DIFF was defined above.

A simple example is presented below to aid in the understanding of the different variables. The example includes specific setpoint and threshold temperatures merely for the purpose of explanation. The present invention is not limited to the exemplary data values but, instead, can operate within a wide variety of temperature ranges.

For example, the desired temperature for the space 102 may be set at 68 degrees. Based on the capacity of the equipment 104 in this space 102, the equipment 104 may need to be switched to cooling mode when the temperature sensed by the sensor 108 rises to 74 degrees or above and be switched to heating mode when the sensed temperature falls below 64 degrees. Thus, $C_{switch}=-6$ degrees (i.e., 68–74) and $H_{switch}=4$ degrees (i.e., 68–64). Secondly, the heating elements of the equipment 104, because of capacity considerations, may for example be required to engage if the sensed temperature is at least two degrees below the setpoint (i.e., $H_{engage}=2$ degrees) and to disengage when the sensed temperature is at least two degrees above the setpoint (i.e., $H_{disengage}=-2$ degree). That is, when the sensed temperature is 66 degrees or below and the equipment 104 is in the heating mode, the equipment 104 will turn on a heat source to warm the space 102 and will shut off the heat source when the sensed temperature reaches 70 degrees. Also, the cooling elements of the equipment 104, because of capacity considerations, may for example be required to engage if the sensed temperature of the space 102 is at least 3 degrees above the setpoint (i.e., $C_{engage}=-3$ degrees) and to disengage when the sensed temperature is at least 3 degrees below the setpoint (i.e., $C_{disengage}=3$ degrees). That is, when the sensed temperature is 71 degrees or above and the equipment 104 is in the cooling mode, the equipment 104 will turn on a cooling source to cool the space 102 and will shut off the cooling source when the temperature reaches 65 degrees.

As can be seen from the exemplary values, $H_{switch} > C_{switch}$; $C_{disengage} > C_{engage}$; and $H_{disengage} < H_{engage}$. Also, the magnitudes of $H_{switch}$ and $C_{switch}$ are approximately double those of $H_{disengage}$ and $C_{disengage}$, respectively.

Figure 2:
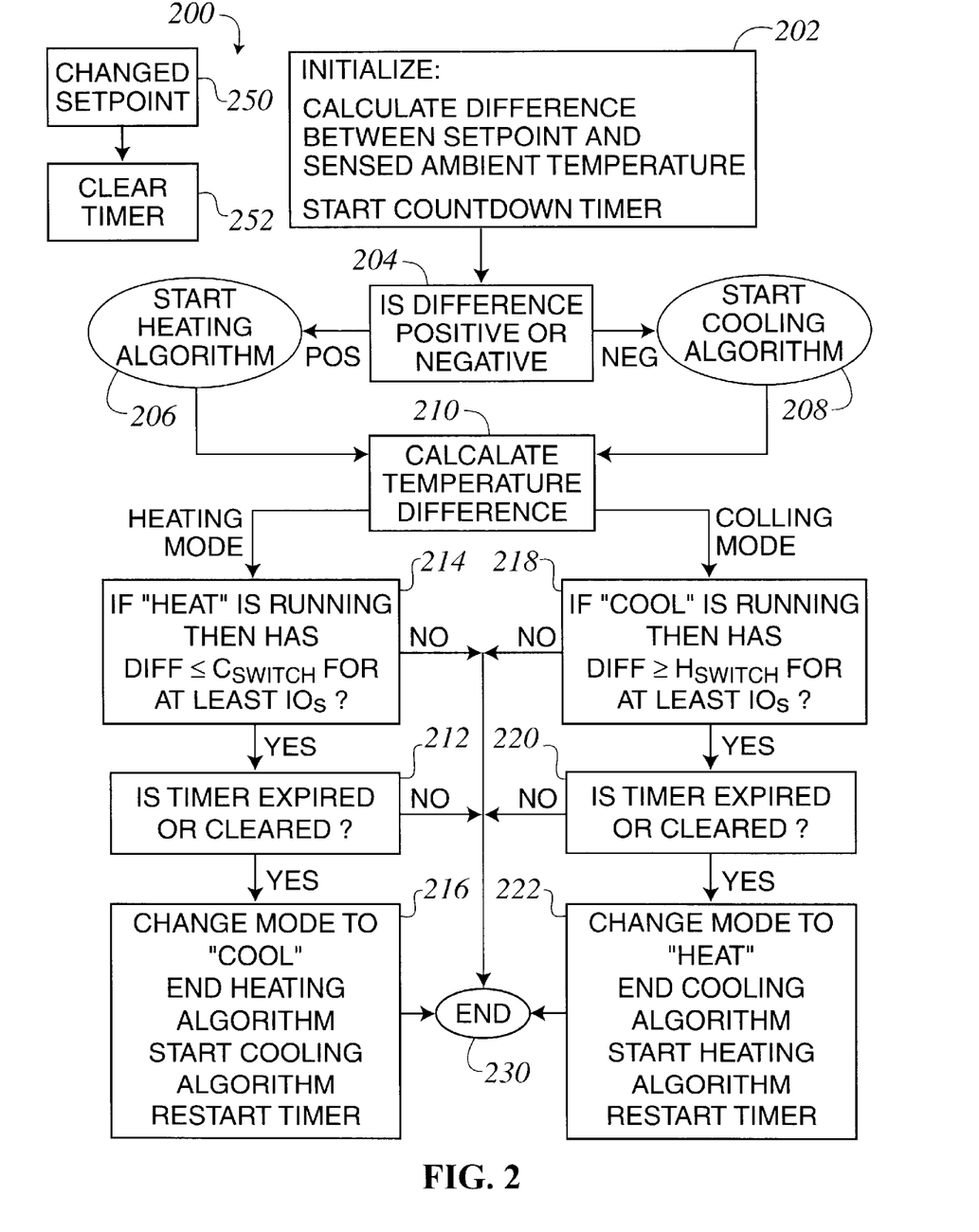
FIG. 2 illustrates a high-level function diagram of exemplary mode switch-over software according to an embodiment of the present invention.

A flowchart of one embodiment of a heating and cooling switchover algorithm 200 for determining the operating mode of the equipment 104 is illustrated in FIG. 2. The logical flow of FIG. 2 can be implemented by software stored in the microcontroller 106. The flowchart of FIG. 2 does not explicitly depict the input steps in which a user or technician enters or sets the various operating points for the equipment 104, as the specifics regarding performance of such data entry steps is not critical to the operation of the switchover algorithm or routine 200. The routine 200 can be a part of, or called from, a system application loop that continuously executes on the microcontroller 106. Such system application software controls all aspects of the complete operation of the equipment 104.

Upon powering-up or being reset, the routine 200 performs an initialization routine in step 202. The initialization step 202 can include calculating the temperature difference (DIFF) between the desired temperature setpoint (SP) and the sensed, ambient temperature (AT) within the space 102. A timer is also started in step 202. For example, a countdown timer can be used to measure a predetermined period of time such that when the timer reaches zero, the expiration of that predetermined period is indicated. The purpose of this timer is to provide a time period in which the operating mode of the equipment 104 cannot be changed. By providing such a time period, the equipment 104 is prevented from oscillating between operating modes at a rate shorter than the predetermined time period.

For exemplary purposes, this timer can be set to nine minutes as nine minutes is a long enough period of time to minimize wear and tear on the equipment 104 and allow transient conditions to settle, but is short enough under most circumstances to prevent the space 102 from significantly deviating from the setpoint temperature. Other timer periods can be selected without deviating from the scope of the present invention.

If during operation of the routine 200, the setpoint SP is changed (Step 250), then the timer, in step 252, is cleared (i.e., set to a value similar to if the timer had been allowed to expire). Accordingly, the receiving of a new setpoint will allow the equipment 104 to change modes immediately instead of waiting for the expiration of the timer.

In step 204, initialization continues by calculating and examining DIFF. If DIFF is positive, then the room temperature AT is below the setpoint SP and the heating mode is selected and the heating algorithm is started in step 206 and allowed to run. This heating algorithm is explained in detail with regard to FIG. 3. If, however, DIFF is negative, then the cooling mode is selected and the cooling algorithm is started in step 208 and allowed to run. The operating mode selection determines which operating mode of the equipment 104 is presently active; it does not determine if the actual heating or cooling elements should be engaged.

Except during the initial running of the routine 200, the entry point into the mode switching routine 200 is step 210. DIFF is calculated in step 210 and the logic flow continues with step 214 or step 218. In step 214, the current mode of operation is checked to see if it is "heating". If so, then DIFF is compared to the threshold $C_{switch}$ to determine if for at least the last 10 seconds whether DIFF has been equal to or below $C_{switch}$. In other words, the sensed temperature is examined to determine if it has been below a predetermined temperature range each time it was checked in the last 10 seconds. As typical microcontrollers, such as microcontroller 106, include clocks and timers 120, determining whether or not the appropriate relationship between DIFF and $C_{switch}$ has been maintained for 10 seconds or more is within the ordinary ability of a skilled programmer.

The length of 10 seconds is exemplary in nature and can be a longer or shorter time period, as well. The longer the period of time, the longer the ambient temperature difference DIFF must be below $C_{switch}$ before the operating mode can be switched to "cooling", thus providing filtering, or smoothing, of the effects of transient temperature changes on the switching of operating modes.

If the condition of step 214 is met, then the timer (from step 202) is checked, in step 212, to see if it has expired; otherwise, if the condition of step 214 is not met, then the routine 200 ends at step 230 until its next execution.

If, according to step 212, the timer has expired, then the flow continues with step 216; otherwise the routine 200 ends at step 230 until its next execution. When the relationship between DIFF and $C_{switch}$ of step 214 is satisfied and the timer has expired, step 216 is reached and the operating mode is changed to "cooling", the heating algorithm is terminated, the cooling algorithm is initiated, and the 9 minute timer is restarted. Step 216, therefore, is reached only if both filtering levels (i.e., the 9 minute timer and the 10 second time period) are satisfied. Accordingly, the routine 200 prevents unwarranted oscillation of the operating modes of the equipment 104 and provides immunity to transient temperature conditions. The actual changing of the equipment 104 to "cooling" mode can be effected by the opening or closing of an appropriate switch 130 or switches in equipment 104.

If the operating mode is "cooling" then execution continues with step 218 which determines if DIFF has been greater than or equal to $H_{switch}$ for at least 10 seconds (or some other time period). In other words, the sensed ambient temperature is examined to see if it has been below a particular temperature range for at least 10 seconds in order to determine whether heating the space 102 is potentially necessary.

If the conditions of step 218 are met, then the timer (from step 202) is checked, in step 220, to see if it has expired; otherwise, if the conditions of step 218 are not met, then the routine 200 ends at step 230 until its next execution.

If, according to step 220, the timer has expired, then the flow continues with step 222; otherwise the routine 200 ends at step 230 until its next execution. When the relationship between DIFF and $H_{switch}$ of step 218 are satisfied and the timer has expired, step 222 is reached and the operating mode is changed to "heating", the cooling algorithm is terminated, the heating algorithm is initiated, and the 9 minute timer is restarted. Step 222, therefore, is reached only if both filtering levels (i.e., the 9 minute timer and the 10 second time period) are satisfied. Accordingly, the routine 200 prevents unwarranted oscillation of the operating modes of the equipment 104 and provides immunity to transient temperature conditions. The actual changing of the equipment 104 to "heating" mode can be effected by the opening or closing of an appropriate switch 130 or switches in equipment 104.

Figure 3:
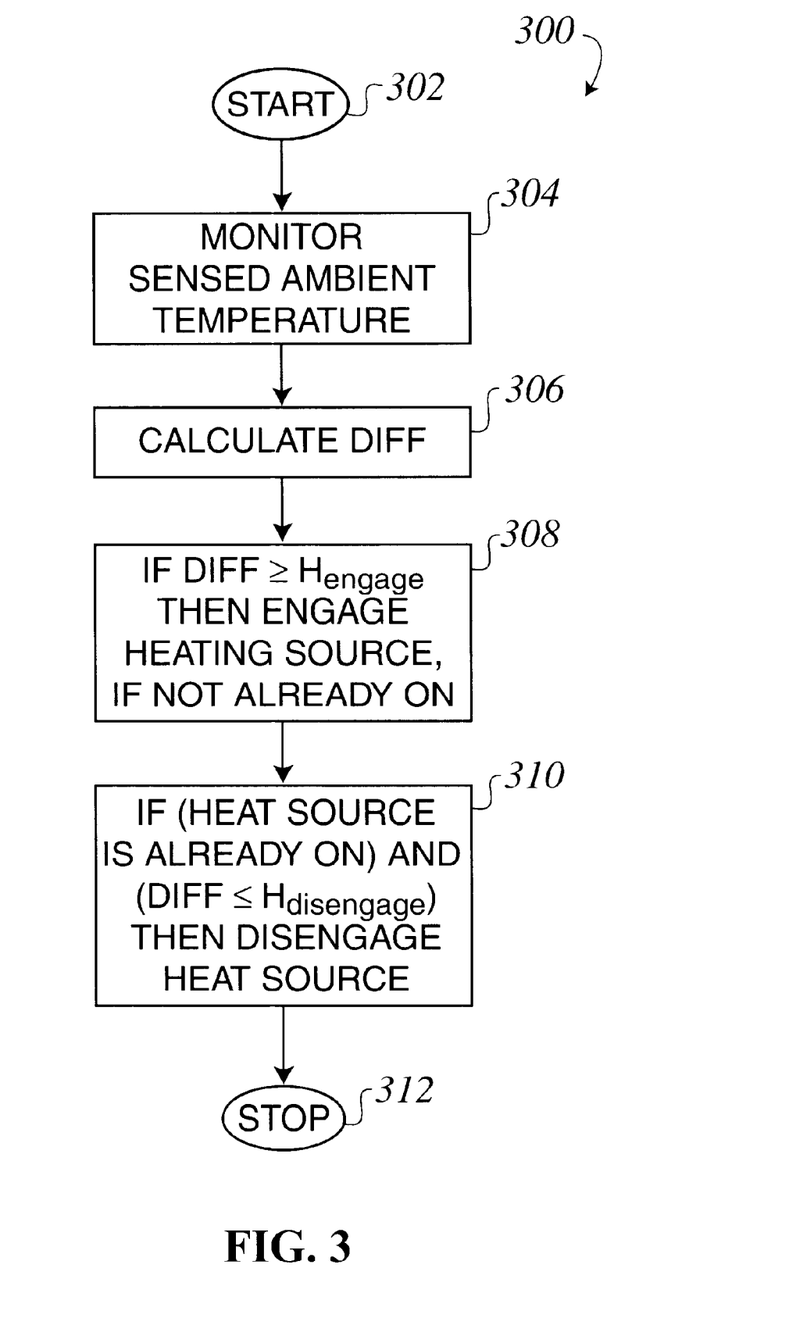
FIG. 3 illustrates a flowchart for a heating algorithm according to an exemplary embodiment of the present invention.
Figure 4:
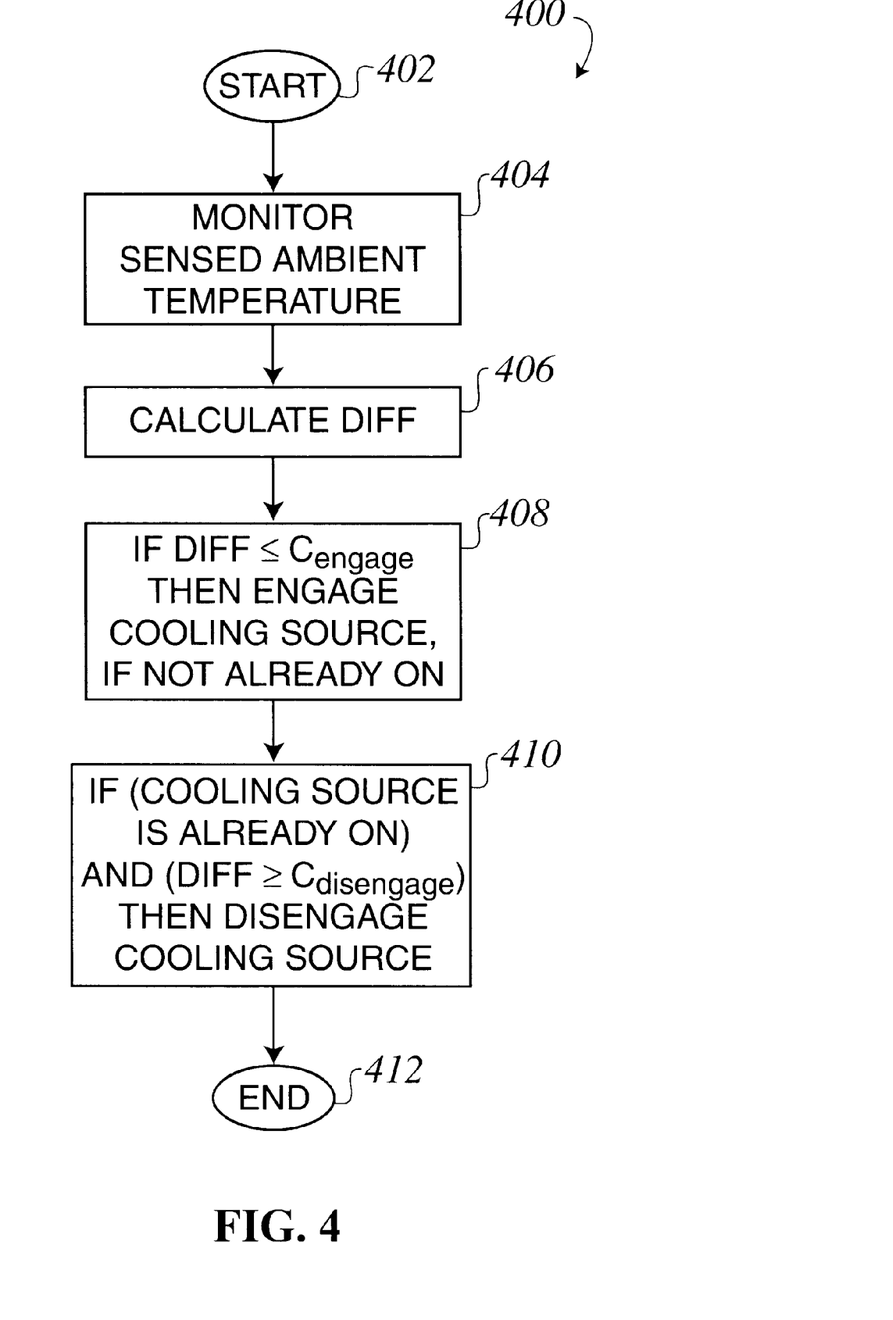
FIG. 4 illustrates a flowchart for a cooling algorithm according to an exemplary embodiment of the present invention.

The previous mode switchover algorithm provides an embodiment of the present invention which determines when the operating mode of the equipment 104 should change between "heating" and "cooling" modes. Within each of these modes, however, are appropriate algorithms for operating within that mode. Exemplary embodiments of the heating and cooling algorithms, referred to earlier, are depicted in FIGS. 3 and 4, respectively. These algorithms can be embodied in software executed by the microcontroller 106 to control the operation of the equipment 104 once its operating mode has been selected.

An embodiment of a heating algorithm, as referred to in either step 206 or 216, is illustrated as a flowchart in FIG. 3. The heating algorithm 300 can be implemented in a software routine that is executed by the microcontroller 106 while the equipment 104 is operating in the heating mode. The heating algorithm 300 is typically executed at least once during each loop of the main system software's execution on the microcontroller 104 when the equipment is in the heating mode. As described in regard to FIG. 2, the heating algorithm 300 can also be initiated during the initialization (step 206) of the switch-over algorithm 200 and also in the performance of step 222. Regardless of the manner in which the heating algorithm 300 is initiated, the algorithm 300 starts at step 302 and continues its execution with step 304. In step 304, the sensed temperature from the conditioned space 102 is obtained. This temperature may be obtained from a value stored in the memory 122 during the execution of some earlier function that senses the ambient temperature, or the temperature can be obtained by polling the temperature sensor 108 for a current value. From the sensed temperature value and a stored setpoint temperature, the difference, DIFF, is calculated in step 306. In other words, the heating algorithm 300 compares the sensed temperature with the setpoint temperature to see if the conditioned space is warmer or cooler than the setpoint temperature.

If the sensed temperature is cooler than the setpoint by more than the predetermined threshold $H_{engage}$, then in step 308 the heating source of the equipment 104 is engaged (if not already engaged) to begin heating the conditioned space 102. The setting of the threshold $H_{engage}$ depends on the heating capacity of the equipment 104, the size of the space 102, and the resolution of the temperature sensor 108.

Alternatively, if the sensed temperature is warmer than the setpoint by more than the predetermined threshold $H_{disengage}$, then in step 310 the heating source of the equipment 104, if already engaged, is disengaged. The setting of the threshold $H_{disengage}$ depends on the heating capacity of the equipment 104, the size of the space 102, and the resolution of the temperature sensor 108.

Selection of the values for $H_{engage}$ and $H_{disengage}$ are within the ability of one of ordinary skill and are selected to prevent the engaging and disengaging of the heat source from unnecessarily oscillating when the temperature range of the conditioned space 102 fluctuates around a small temperature zone around the setpoint.

The heating algorithm 300 ends with step 312.

An embodiment of a cooling algorithm, as referred to in either step 208 or 222, is illustrated as a flowchart in FIG. 4. The cooling algorithm 400 can be implemented in a software routine that is executed by the microcontroller 106 while the equipment 104 is operating in the cooling mode. The cooling algorithm 400 is typically executed at least once during each loop that the main system software executes on the microcontroller 104 when the equipment is in the cooling mode. As described in regard to FIG. 2, the cooling algorithm 400 is also initiated during the initialization (step 208) of the switch-over algorithm 200 and also in the performance of step 216. Regardless of the manner in which the cooling algorithm 400 is initiated, the algorithm 400 starts at step 402 and continues its execution with step 404. In step 404, the sensed temperature from the conditioned space 102 is obtained. This temperature may be obtained from a value stored in the memory 122 during the execution of an earlier function which sense the ambient temperature, or the temperature can be obtained by polling the temperature sensor 108 for a current value. From the temperature value and the stored setpoint temperature, the difference, DIFF, is calculated in step 406. In other words, the cooling algorithm 400 compares the sensed temperature with the setpoint temperature to see if the conditioned space is warmer or cooler than the set point temperature.

If the sensed temperature is warmer than the setpoint by more than the predetermined threshold $C_{engage}$, then in step 408 the cooling source of the equipment 104 is engaged (if not already engaged) to begin cooling the conditioned space 102. The setting of the threshold $C_{engage}$ depends on the cooling capacity of the equipment 104, the size of the space 102, and the resolution of the temperature sensor 108.

Alternatively, if the sensed temperature is cooler than the setpoint by more than the predetermined threshold $C_{disengage}$, then in step 410 the cooling source of the equipment 104, if already engaged, is disengaged. The setting of the threshold $C_{disengage}$ depends on the cooling capacity of the equipment 104, the size of the space 102, and the resolution of the temperature sensor 108.

Selection of the values of $C_{engage}$ and $C_{disengage}$ are within the ability of one of ordinary skill and are selected to prevent the engaging and disengaging of the cooling source from unnecessarily oscillating when the temperature range of the conditioned space 102 fluctuates around a small temperature zone around the setpoint.

The cooling algorithm 400 ends with step 412.

Accordingly, a set of algorithms have been presented for controlling the operation of microcontroller-based HVAC equipment that includes both a heating and cooling mode of operation. These algorithms rely on the identification of threshold temperature differences, $C_{switch}$ and $H_{switch}$, that determine the permitted variation of the conditioned space from a setpoint temperature before the operating mode of the HVAC equipment is changed between heating and cooling modes. Depending on the mode of operation determined by the switch-over algorithm, either a heating or cooling algorithm is executed to control the conditioning of the space using a differential/limit method. Each of these algorithms rely on the identification of "engaging" and "disengaging" thresholds that determine how far the conditioned space can vary from the setpoint before the cooling (or heating) equipment is appropriately engaged or disengaged. Preferably the predetermined thresholds are stored in a programmable, non-volatile memory such that they can be modified or tuned for a specific conditioned space by an installer during equipment installation or by the microcontroller during installation. As a result, a room occupant need only supply a single setpoint temperature to the HVAC equipment through a simple interface in order to easily set the operating parameters of the equipment such that the temperature of the conditioned space is maintained as desired.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A method for controlling equipment having operating modes, including a heating mode and a cooling mode of operation for conditioning a physical space, the method comprising the steps of:

obtaining a setpoint temperature for the physical space;

sensing a temperature of the physical space;

determining a mode-switching time period corresponding to a length of time since an operating mode of the equipment has been switched;

if the sensed temperature remains above a first threshold temperature for more than a first time period, then switching the equipment to the cooling mode of operation if the mode-switching time period is longer than a predetermined time period;

wherein threshold temperature is greater than the setpoint temperature;

if the sensed temperature remains below a second threshold temperature for more than the first time period, then switching the equipment to the heating mode of operation if the mode-switching time period is longer than the predetermined time period, and wherein the second threshold temperature is lower than the setpoint temperature.

2. The method according to claim 1, wherein:

the step of switching to the cooling mode is performed only if the equipment is not already in the cooling mode; and the step of switching to the heating mode is performed only if the equipment is not already in the heating mode.

3. The method according to claim 1, further comprising the steps of:

obtaining a new setpoint temperature different than the setpoint temperature;

determining new first and second threshold temperatures based on the new setpoint temperature; and wherein the step of switching to the cooling mode is performed even if the mode-switching time period is shorter than the predetermined time period.

4. The method according to claim 1, further comprising the step of:

obtaining a new setpoint temperature different than the setpoint temperature; and wherein the step of switching to the heating mode is performed even if the mode-switching time period is shorter than the predetermined time period.

5. The method according to claim 1, further comprising the steps of:

determining if the sensed temperature remains above the first threshold temperature for more than the first time period by:

obtaining a first temperature difference threshold, $C_{switch}$, periodically subtracting the sensed temperature from the setpoint temperature to produce a series of first differences, and determining if the periodically produced first differences remain less than or equal to $C_{switch}$ for the first time period; and determining if the sensed temperature remains below the second threshold temperature for more than the first time period by:

obtaining a second temperature threshold $C_{switch}$, periodically subtracting the sensed temperature from the setpoint temperature to produce a series of second differences, and determining if the periodically produced second differences remain more 15 than or equal to $H_{switch}$ for the first time period.

6. The method according to claim 1, wherein the step of switching to the cooling mode includes the steps of:

terminating a heating algorithm, said heating algorithm controlling the operation of the equipment when in the heating mode of operation;

initiating a cooling algorithm, said cooling algorithm controlling the operation of the equipment when in the cooling mode of operation; and resetting the mode-switching time period.

7. The method according to claim 6, wherein the cooling algorithm includes the steps of:

if the sensed temperature is greater than or equal to a third threshold temperature, then disengaging a cooling source of the equipment if the cooling source is not already engaged; and if the sensed temperature is less than or equal to a fourth threshold temperature, then disengaging the cooling source if the cooling source is already engaged.

8. The method according to claim 7, further comprising the steps of:

determining if the sensed temperature is greater than or equal to the third threshold temperature by:
obtaining a first threshold temperature difference, $C_{engage}$,
subtracting the sensed temperature from the setpoint to produce a third difference, and
determining if the third difference is less than or equal to $C_{engage}$; and determining if the sensed temperature is less than or equal to the fourth threshold temperature by:
obtaining a second threshold temperature difference, $C_{disengage}$,
subtracting the sensed temperature from the setpoint to produce a fourth difference, and
determining if the fourth difference is greater than or equal to $C_{disengage}$.

9. The method according to claim 1, wherein the step of switching to the heating mode includes the steps of:

terminating a cooling algorithm, said cooling algorithm controlling the operation of the equipment when in the cooling mode of operation;

initiating a heating algorithm, said heating algorithm controlling the operation of the equipment when in the heating mode of operation; and resetting the mode-switching time period.

10. The method according to claim 9, wherein the heating algorithm includes the steps of:

if the sensed temperature is less than or equal to a third threshold temperature, then engaging a heating source of the equipment if the heating source is not already engaged; and if the sensed temperature is greater than or equal to a fourth threshold temperature, then disengaging the heating source if the heating source is already engaged.

11. The method according to claim 10, further comprising the steps of:

determining if the sensed temperature is less than or equal to the third threshold temperature by:
obtaining a first threshold temperature difference, $H_{engage}$
subtracting the sensed temperature from the setpoint to produce a third difference, and
determining if the third difference is greater than or equal to $H_{engage}$; and determining if the sensed temperature is greater than or equal to the fourth threshold temperature by:
obtaining a second threshold temperature difference, $H_{disengage}$,
subtracting the sensed temperature from the setpoint to produce a fourth difference, and
determining if the fourth difference is less than or equal to $H_{disengage}$.

12. An apparatus for controlling equipment having a heating mode and a cooling mode of operation for conditioning a physical space, the apparatus comprising:

a microcontroller configured to control operation of the equipment;

a first input configured to receive a setpoint temperature;

a second input configured to receive a temperature of the physical space;

a first timer configured to measure a first time period associated with the length of time since an operating mode of the equipment has been switched;

a comparator configured to:
compare the received temperature with a first threshold temperature, if the equipment is in a heating mode, and
compare the received with a second threshold temperature, if the equipment is in a cooling mode; and a first output configured to:
signal the equipment to switch from the heating mode to the cooling mode, if the received temperature has remained above the first threshold temperature for at least a second time period and the first time period exceeds or equals a predetermined time period, and
signal the equipment to switch from the cooling mode to the heating mode, if the received temperature has remained below the second threshold temperature for at least a third time period and the first time period exceeds or equals the predetermined time period.

13. The apparatus according to claim 12, wherein:

the first input is further configured to receive a new setpoint temperature; and the first timer is further configured to reset itself in response to the new setpoint temperature.

14. The apparatus of claim 12, wherein the first timer further comprises:

a countdown timer with an initial value equal to the first time period and configured to begin operation when the equipment switches operating modes.

15. The apparatus according to claim 12, further comprising:

a memory configured to store a first temperature difference threshold, $C_{switch}$;

subtracting circuitry configured to periodically subtract the received temperature from the setpoint temperature to produce a series of first differences; and comparison circuitry configured to determine if the periodically produced first differences remain less than or equal to $C_{switch}$ for at least the second time, period and wherein the determination by the comparison circuitry indicates whether or not the received temperature has remained above the first threshold temperature for at least the second time period.

16. The apparatus according to claim 12, further comprising:

a memory configured to store a first temperature difference threshold, $H_{switch}$;

subtracting circuitry configured to periodically subtract the received temperature from the setpoint temperature to produce a series of first differences; and comparison circuitry configured to determine if the periodically produced first differences remain more than or equal to $H_{switch}$ for at least the third time period, and wherein the determination by the comparison circuitry indicates whether or not the received temperature had remained below the second threshold temperature for at least the third time period.

17. The apparatus according to claim 12, further comprising:
  a first memory configured to store:
    a cooling algorithm, said cooling algorithm controlling the operation of the equipment when in the cooling mode of operation; and
    a heating algorithm, said heating algorithm controlling the operation of the equipment when in the heating mode of operation.

18. The apparatus according to claim 17, further comprising:
  a second output configured to:
    signal the microcontroller to initiate execution of the cooling algorithm when the equipment is switched from the heating mode to the cooling mode; and
    signal the first timer to reset.

19. The apparatus according to claim 17, further comprising:
  a second output configured to:
    signal the microcontroller to initiate execution of the heating algorithm when the equipment is switched from the cooling mode to the heating mode; and
    signal the first timer to reset.

20. A method for maintaining a room temperature in a tolerance band around a setpoint temperature, the method comprising the steps of:
  sensing the room temperature;
  maintaining a mode-switching time value relating to a first time period since an operating mode of conditioning equipment has changed, wherein the conditioning equipment has a cooling mode and a heating mode of operation for affecting the temperature of the room;
  if the equipment is in the heating mode of operation, then:
    switching the equipment to the cooling mode if the sensed room temperature has remained above a first threshold temperature for a first predetermined length of time and the mode-switching time value indicates that the first time period is greater than or equal to a second predetermined length of time, wherein the first threshold temperature is greater than the setpoint temperature, and
    initiating a cooling algorithm, said cooling algorithm controlling operation of the equipment when in the cooling mode; and
  if the equipment is in the cooling mode of operation, then:
    switching the equipment to the heating mode if the sensed room temperature has remained below or equal to a second threshold temperature for the first predetermined length of time and the mode-switching time value indicates that the first time period is greater than or equal to the second predetermined length of time, wherein the second threshold temperature is less than the setpoint temperature, and
    initiating a heating algorithm, said heating algorithm controlling operation of the equipment when in the heating mode.

21. The method according to claim 20, wherein the cooling algorithm includes the steps of:
  if the sensed room temperature is greater than or equal to a third threshold temperature, then engaging a cooling source of the equipment if the cooling source is not already engaged; and
  if the sensed room temperature is less than or equal to a fourth threshold temperature, then disengaging the cooling source if the cooling source is already engaged.

22. The method according to claim 20, wherein the heating algorithm includes the steps of:
  if the sensed room temperature is less than or equal to a third threshold temperature, then engaging a heating source of the equipment if the heating source is not already engaged; and
  if the sensed room temperature is greater than or equal to a fourth threshold temperature, then disengaging the heating source if the heating source is already engaged.

23. A method for controlling equipment that includes a heating and a cooling mode of operation to condition the temperature of a room, the method comprising the steps of:
  (a) obtaining a setpoint temperature for the room;
  (b) periodically sensing the ambient temperature of the room, wherein a series of ambient temperatures are sensed;
  (c) determining a series of differences by subtracting the setpoint temperature from each sensed ambient temperature;
  (d) determining if substantially all of a subset of the differences are:
    (d.1) greater than or equal to a first predetermined threshold, if the equipment is in a heating mode, or
    (d.2) less than or equal to a second predetermined threshold, if the equipment is in a cooling mode,
  wherein the subset includes those differences relating to the ambient temperatures sensed during a first time period;
  (e) determining if a second time period has elapsed since the equipment has changed between modes of operation;
  (f) if the second time period has elapsed and substantially all of the subset of differences are determined to be greater than or equal to the first predetermined threshold, then generating a first control signal for switching the equipment to the cooling mode; and
  (g) if the second time period has elapsed and substantially all of the subset of differences are determined to be less than or equal to the second predetermined threshold, then generating a second control signal for switching the equipment to the heating mode.

24. The method according to claim 23, wherein the first predetermined threshold his based on the cooling capacity of the equipment.

25. The method according to claim 23, wherein the second predetermined threshold is based on the heating capacity of the equipment.

* * * * *